United States Patent Office 2,802,865
Patented Aug. 13, 1957

2,802,865

METHYLAMINOPROPIOPHENONE COMPOUNDS AND METHODS FOR PRODUCING THE SAME

Yvon J. L'Italien, Hazel Park, and Mildred C. Rebstock, Detroit, Mich., assignors to Parke, Davis & Company, Detroit, Mich., a corporation of Michigan No Drawing. Application June 15, 1954, Serial No. 437,012

12 Claims. (Cl. 260—501)

This invention relates to an aminoketone and salts thereof having valuable analeptic properties and to methods for producing the same. More particularly, the invention relates to l-α-methylaminopropiophenone,

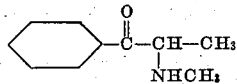

l-optical form to acid addition salts of this substance with inorganic and organic acids and to methods for producing the aforementioned compounds.

The l-α-methylaminopropiophenone compounds of the invention have a very high degree of analeptic activity. These products have a higher degree of analeptic activity than such well known analeptics as the corresponding compounds of dl-amphetamine, d-amphetamine and l-amphetamine. Tests have also demonstrated that the compounds of the invention possess a much higher degree of analeptic activity than the corresponding dl-α-methylaminopropiophenone compounds. To date, the best method for evaluating the analeptic activity of a substance is that devised by J. W. Schulte, M. L. Tainter and J. M. Dille and described in the Proceedings of the Society of Experimental Biology and Medicine, 42; 242 (1939). This test method measures the cerebral stimulating activity of the substance under evaluation. The following table shows a comparison of the cerebral stimulating activities of l-α-methylaminopropiophenone, dl-α-methylaminopropiophenone, dl-amphetamine, d-amphetamine and l-amphetamine hydrochlorides when tested by this procedure.

TABLE

| Substance Tested | Activity (5 Hrs.) Revolutions+S. E. |
|---|---|
| l-α-methylaminopropiophenone hydrochloride | 202.0±50.4 |
| dl-α-methylaminopropiophenone hydrochloride | 163.0±30.9 |
| dl-amphetamine hydrochloride | 125.1±13.6 |
| d-amphetamine hydrochloride | 136.0±27.7 |
| l-amphetamine hydrochloride | 42.2±5.2 |

Each of the substances tested was administered to six rats at a dose level of 4 mg. per kilo. of body weight.

For therapeutic purposes the products of the invention are usually administered orally in the acid addition salt form. Some of the many acid addition salts derived from organic and inorganic acids which may be used therapeutically are the hydrochloride, hydrobromide, phosphate, citrate, maleate, tartrate, sulfate, camphor sulfonate, succinate, phenylsuccinate, sulfamate and the like salts.

In accordance with the invention, the l-α-methylaminopropiophenone compounds can be produced either from dl-α-methylaminopropiophenone or from l-ephedrine. In producing the l-α-methylaminopropiophenone compounds from dl-α-methylaminopropiophenone, one reacts the dl-α-methylaminopropiophenone with an optically active acid and separates the mixture of salts so obtained by fractional crystallization. If desired, the salt of l-α-methylaminopropiophenone with the optically active acid so obtained can be employed as an analeptic but in most instances, it is preferable to convert this salt to an acid addition salt of the type normally used in the administration of medicinals capable of forming salts with acids. Some examples of this latter type of salt are the hydrochloride, phosphate, citrate, sulfate, bromide, sulfamate, tartrate and the like.

The production of the l-α-methylaminopropiophenone compounds from dl-α-methylaminopropiophenone can be carried out in one or two stages. In the two stage method of preparation the mixture of salts of the d and l-α-methylaminopropiophenones with the optically active acid is isolated and then subjected to fractional crystallization while in the one stage method of preparation the reaction between the dl-α-methylaminopropiophenone and the optically active acid is carried out in a solvent and the desired l-α-methylaminopropiophenone isolated directly from the reaction mixture. The choice of the optically active acid is not too critical but it is essential that the acid be such that the salts produced upon reaction with the d and l-α-methylaminopropiophenone present in the racemic α-methylaminopropiophenone differ sufficiently in their solubility characteristics to permit their separation by fractional crystallization. Of the many optically active acids examined it has been found that the d and l camphor sulfonic acids produce the most easily separable mixtures of salts and for this reason they are the preferred acids to use in the process. In carrying out the process, it is also preferable regardless of the optically active acid employed, to use approximately equivalent amounts of the starting materials, that is, of the dl-α-methylaminopropiophenone and the optically active acid. As solvents, the lower aliphatic alcohols or aqueous mixtures thereof may be used. When carrying out the reaction in two stages the solvent used in the first stage is not particularly critical. However, in the second stage of the process or when carrying out the process in one stage it is preferable to employ an anhydrous alcohol as the solvent and that the alcohol be one containing a branched carbon chain. Some specific examples of such branched chain alcohols which can be used are isopropyl, isobutyl, isoamyl, tertiary amyl and secondary butyl alcohols. The reaction between the optically active acid and the dl-α-methylaminopropiophenone is usually carried out at about room temperature but higher or lower temperatures can be employed if desired.

Where one wishes to convert a salt of l-α-methylaminopropiophenone with an optically active acid to an acid addition salt of the type usually employed in the administration of medicinals capable of forming salts with acids or to convert one acid addition salt of l-α-methylaminopropiophenone to another acid addition salt, the salt to be converted is dissolved in water, alcohol or some other suitable solvent, an excess of ammonia or an alkali such as sodium hydroxide, potassium carbonate, potassium hydroxide or sodium bicarbonate added to produce the free base of l-α-methylaminopropiophenone and the resultant free base treated with the acid corresponding to the salt desired. In some instances it is also possible to convert one acid addition salt to another acid addition salt by dissolving the salt to be converted in a solvent and passing the solution over an ion exchange resin impregnated with the acid corresponding to the salt desired.

As mentioned above one can produce l-α-methylaminopropiophenone from l-ephedrine. This is accomplished by oxidizing the l-ephedrine to the desired substance. The oxidation is best carried out under acid conditions using chromic acid, or an alkali metal dichromate such as sodium dichromate or potassium dichromate as the oxidizing agent. The *l*-ephedrine can be used in the form of the free base or in the form of an acid addition salt such as the hydrochloride, sulfate or similar mineral acid salt. When the oxidation is carried out under acid conditions such as for example in a dilute solution of sulfuric acid or aqueous solution of chromic acid, the *l*-ephedrine used as the starting material is in any event present in the reaction mixture as an acid addition salt of the *l*-α-methylaminopropiophenone obtained as result of the reaction is also present in the reaction mixture in the form of an acid addition salt. The desired product can be recovered from the reaction mixture as the free base subsequent to neutralization of the mixture or the free base can first be separated in crude form and then converted to the same or a different acid addition salt. The oxidation is usually carried out at room temperature but a higher or lower temperature can be employed if desired. Generally speaking, temperatures in excess of 50° C. should not be used with the aforementioned oxidizing agents because such higher temperatures tend to cause excessive oxidative destruction of the *l*-ephedrine and the desired *l*-α-methylaminopropiophenone.

The invention is illustrated by the following examples:

*Example 1*

A solution composed of 0.99 g. of sodium dichromate and 1.33 g. of concentrated sulfuric acid dissolved in 4.46 cc. of water is added slowly with stirring to 1.65 g. of *l*-ephedrine dissolved in 4.7 cc. of water and 0.52 cc. of concentrated sulfuric acid at room temperature. The mixture is stirred at room temperature for an additional 4 to 6 hours and then made alkaline with sodium hydroxide solution. The aqueous mixture is extracted with two volumes of chloroform and then with two volumes of ether. The organic extracts containing the free base of *l*-α-methylpropiophenone are combined, treated with an excess of dry hydrogen chloride and the solvents evaporated. The residual *l*-α-methylaminopropiophenone hydrochloride is stirred with petroleum ether, collected and purified by dissolving in ethanol and reprecipitating with ether; M. P. 182–184° C.; $[\alpha]_D^{25} = -53°$ ($c=1\%$ in water).

*Example 2*

A solution consisting of 0.99 g. of sodium dichromate, 1.32 g. of concentrated sulfuric acid and 4.46 cc. of water is added dropwise with stirring at room temperature to 1.65 g. of *l*-ephedrine dissolved in 4.7 cc. of water and 0.52 cc. of concentrated sulfuric acid. The reaction mixture is stirred at room temperature for 4 to 6 hours, made alkaline with sodium hydroxide solution and the desired free base of *l*-α-methylaminopropiophenone extracted from the aqueous solution with ether. The ether extract is dried over anhydrous magnesium sulfate and then the free base of the *l*-α-methylaminopropiophenone converted to the *d*-camphor sulfonate salt by adding 2 g. of *d*-camphor sulfonic acid to the solution. The oily precipitate which separates is removed and stirred with fresh ether which causes it to solidify. The *l*-α-methylaminopropiophenone *d*-camphor sulfonate so obtained is purified further by recrystallization from secondary butanol; M. P. 138–139° C.; $[\alpha]_D^{22} = -12.9°$ ($c=10.4\%$ in water).

*Example 3*

50 g. of *dl*-α-methylaminopropiophenone hydrochloride is shaken with 500 cc. of cold 0.5 normal sodium hydroxide solution and 800 cc. of ether. The ether layer which contains the free base of *dl*-α-methylaminopropiophenone is separated, washed with 300 cc. of cold water and then dried over anhydrous magnesium sulfate. The dried ether solution is added to a solution of 58.1 g. of *d*-camphor sulfonic acid in 100 cc. of absolute ethanol, the mixture allowed to stand overnight at about 5° C. and the *d*-camphor sulfonate salt of *dl*-α-methylaminopropiophenone collected; M. P. 136–138° C.

104 g. of *dl*-α-methylaminopropiophenone, *d*-camphor sulfonate (prepared as described above or by ether precipitation from an amyl alcohol solution containing equivalent amounts of *dl*-α-methylaminopropiophenone and *d*-camphor sulfonic acid) is dissolved in 312 cc. of isobutanol at room temperature, the solution filtered and then the filtrate allowed to stand at 0–5° C. for 48 hours. The crude *l*-α-methylaminopropiophenone *d*-camphor sulfonate which has separated from the solution is collected and dried. The material obtained at this point usually has an optical rotation of about $[\alpha]_D^{22} = -9.7°$ ($c=8.3\%$ in water). A second crop of the desired product can be obtained by further cooling of the filtrate. The pure *l*-α-methylaminopropiophenone *d*-camphor sulfonate is obtained by recrystallizing the crude salt from isobutanol. For each 8.4 g. of the crude salt about 32 cc. of isobutanol is employed and about 5.9 g. of the pure product obtained. If desired, isopropanol can be used for this recrystallization. In this case, about 25 cc. of isopropanol is employed for each 8.4 g. of the crude salt and about 7.4 g. of the pure material is obtained. The pure *l*-α-methylaminopropiophenone *d*-camphor sulfonate has an optical rotation of $[\alpha]_D^{22} = -12.9°$ ($c=10.4\%$ in water) and a melting point of 138–139° C.

The *l*-α-methylaminopropiophenone *d*-camphor sulfonate, prepared above, is shaken with an ice cold mixture consisting of 1.1 equivalents of 0.5 N sodium hydroxide solution and two volumes of ether or chloroform. The organic layer containing the free base of *l*-α-methylaminopropiophenone is separated and the aqueous solution extracted with two volumes of ether or chloroform. The extracts are combined with the organic layer, washed with a small amount of water and dried for a short time over magnesium sulfate. The dried solution of the free base is saturated with hydrogen chloride, the solvents evaporated under reduced pressure and the residual oil taken up and recrystallized from ethanol-ether mixture or chloroform-petroleum ether mixture. The *l*-α-methylaminopropiophenone hydrochloride so obtained has a melting point of 182–183° C. and an optical rotation of $[\alpha]_D^{25} = -53$ ($c=1\%$ in water).

If desired, *l*-camphor sulfonic acid can be substituted for the *d*-camphor sulfonic acid used in the above procedure. In this case the salt of the *d*-α-methylaminopropiophenone separates first in the fractional crystallization step and it is necessary to recover the salt of the desired *l*-α-methylaminopropiophenone from the solution after removal of the salt of the *d*-isomer.

*l*-Mandelic acid, *d* (+) dibenzoyltartaric acid and *d* (+) phenylsuccinic acid can also be used but the mixture of salts obtained by the use of these acids is difficult to separate by fractional crystallization. The properties of the salts of *l*-α-methylaminopropiophenone and the aforementioned acids are as follows:

*l* (−) mandelate salt of *l*-α-methylpropiophenone (from isopropanol); M. P. 111–112° C.; $[\alpha]_D^{22} = (-) 89.3°$ ($c=4\%$ in water)

*d* (+) dibenzoyltartrate salt of *l*-α-methylpropiophenone (from ethanol); M. P. 141–142° C.; $[\alpha]_D^{22} = -96°$ ($c=4.32\%$ in water)

*d* (+) phenylsuccinate salt of *l*-α-methylpropiophenone (from ethanol); M. P. 143–144° C.; $[\alpha]_D^{22} = +57.2°$ ($c=2.73\%$ in water)

The aforementioned salts can also be prepared by reacting the free base of *l*-α-methylaminopropiophenone with the respective optically active acid.

Other salts of *l*-α-methylaminopropiophenone can be prepared as follows:

2 g. of solid sodium bicarbonate is added to a concentrated aqueous solution containing 3 g. of *l*-α-methylaminopropiophenone hydrochloride and the resulting mixture extracted with three 25 cc. portions of ether. The ether extracts which contain the free base of *l*-α-methylaminopropiophenone are combined, dried and treated with one equivalent of dry hydrogen bromide. The gummy product which separates from the solution is collected and purified by recrystallization from ethanol ether mixture to obtain the desired l-α-methylaminopropiophenone hydrobromide in pure form; M. P. 164–166° C.; $[\alpha]_D^{26} = -42.5°$ ($c=2\%$ in water).

3 g. of l-α-methylaminopropiophenone hydrochloride is converted to the free base as described in the preceding paragraph and the dry ether solution treated with one equivalent of phosphoric acid. The crude product which separates from the solution is collected and purified by recrystallization from ethanol to obtain the phosphate salt of l-α-methylaminopropiophenone; M. P. 135–140° C.; $[\alpha]_D^{26} = -31.8°$ ($c=2\%$ in water).

What we claim is:

1. A compound of the class consisting of l-α-methylaminopropiophenone and its acid addition salts.
2. A mineral acid salt of l-α-methylaminopropiophenone.
3. l-α-Methylaminopropiophenone hydrochloride.
4. l-α-Methylaminopropiophenone hydrobromide.
5. l-α-Methylaminopropiophenone phosphate.
6. An optically active organic acid salt of l-α-methylaminopropiophenone.
7. l-α-Methylaminopropiophenone d-camphor sulfonate.
8. l-α-Methylaminopropiophenone.
9. Process for producing a compound of the class consisting of l-α-methylaminopropiophenone and its acid addition salts which comprises oxidizing a compound of the class consisting of l-ephedrine and its acid addition salts with an oxidizing agent of the class consisting of alkali metal dichromates and chromic acid.
10. Process for producing a mineral acid salt of l-α-methylaminopropiophenone which comprises oxidizing a mineral acid salt of l-ephedrine under acid conditions with sodium dichromate.
11. Process for producing an optically active organic acid salt of l-α-methylaminopropiophenone which comprises reacting dl-α-methylaminopropiophenone with an equivalent amount of an optically active camphor sulfonic acid and separating the optically active camphor sulfonic acid salt of l-α-methylaminopropiophenone from the optically active camphor sulfonic acid salt of d-α-methylaminopropiophenone by fractional crystallization.
12. Process according to claim 11 wherein the optically active acid is d-camphor sulfonic acid.

References Cited in the file of this patent

UNITED STATES PATENTS

| | | |
|---|---|---|
| 1,954,389 | Legerlotz | Apr. 10, 1934 |
| 2,155,194 | Kamlet | Apr. 18, 1939 |

OTHER REFERENCES

Gilman "Organic Chemistry" (1938), page 192.